United States Patent [19]

Negrutsky et al.

[11] Patent Number: 4,703,835

[45] Date of Patent: Nov. 3, 1987

[54] HOISTING APPARATUS

[75] Inventors: Sergei B. Negrutsky; Vladimir G. Churkin; Mikhail I. Chunikhin, all of Karaganda, U.S.S.R.

[73] Assignee: Upravlenie Po Montazhu, Demontazhu I Remontu Gornoshakhtnogo Oborudovania "Spetsshakhtomontazh", Karaganda, U.S.S.R.

[21] Appl. No.: 887,087

[22] PCT Filed: Nov. 2, 1984

[86] PCT No.: PCT/SU84/00058

§ 371 Date: Jun. 26, 1986

§ 102(e) Date: Jun. 26, 1986

[87] PCT Pub. No.: WO86/02624

PCT Pub. Date: May 9, 1986

[51] Int. Cl.$^4$ ............................................. B66B 11/04
[52] U.S. Cl. ........................................ 187/17; 277/3; 254/389
[58] Field of Search ............. 187/1 R, 17, 20; 277/3, 277/135, 15; 254/389

[56] References Cited

U.S. PATENT DOCUMENTS

| | | | |
|---|---|---|---|
| 759,659 | 5/1904 | Braungart, Jr. | 277/3 |
| 2,222,685 | 11/1940 | Raymond | 187/17 |
| 2,466,025 | 4/1949 | Hanson | 277/3 |
| 3,252,547 | 5/1966 | Hornedo | 187/17 |
| 4,005,580 | 2/1977 | Sweaninger | 277/3 |
| 4,043,428 | 8/1977 | White et al. | 187/17 |

FOREIGN PATENT DOCUMENTS 159269 12/1963 U.S.S.R. .
548531 2/1977 U.S.S.R. .
588177 1/1978 U.S.S.R. .
975553 11/1982 U.S.S.R. .

Primary Examiner—Joseph J. Rolla
Assistant Examiner—Kenneth Noland
Attorney, Agent, or Firm—Fleit, Jacobson, Cohn & Price

[57] ABSTRACT

A hoisting apparatus comprising a hydraulic cylinder (1) a piston (3) whereof is connected to a load-handling attachment via a pliable member (6) which passes through a sealing device (9) that is located outside the cylinder (1) and consists of two consecutively arranged chambers (10, 11) separated by seals (12, 13, 14). The chamber (10) next to the cylinder space is filled with a sealing fluid whose viscosity is higher than the viscosity of the hydraulic fluid and the other chamber (11) is connected to a separator (18) adapted to separate the hydraulic fluid from the sealing fluid and to feed them to the space (4) of the hydraulic cylinder and the chamber (10) of the sealing device (9), respectively.

5 Claims, 3 Drawing Figures

HOISTING APPARATUS

TECHNICAL FIELD

The present invention relates to materials handling equipment and is specifically concerned with hydraulically-driven hoisting apparatus.

The invention may find application as means of hauling men and loads to and from coal and ore mines, being installed at shafts and slopes.

The invention may also be used to advantage in a passenger lifts and in various other industries for handling vertical loads.

BACKGROUND ART

The capacity of hoisting installations has become a problem when loads are hauled over sunk shafts. No increases in the capacity of drum-type hoists can be achieved without significantly increasing the size and mass of the drums and reduction gears. Largesize equipment requires much space underground which must be cut and maintained eventually. The haulage and installation of bulky equipment in a mine which is cramped for room may cause difficulties. There is also no special drive in an explosion-proof enclosure which can meet the requirements of a powerful hoist.

Known in the art of hydraulic apparatus for lowering loads which incorporates a platform connected by means of a rope and sheaves to a counterweight in the form of a piston which travels up and down in a hollow column filled with a hydraulic fluid (cf. USSR Inventor's Certificate No. 159,269, IPC B 66 B 19/00).

Since the piston is heavier than the platform, this rises into the topmost position of its own accord on being unloaded. For lowering a load, a throttle valve is used to dissipate the energy of the hydraulic fluid which is formed during an upward motion of the piston under the action of the loaded platform. The known apparatus cannot lift the loaded platform. Moreover, the energy accumulated in the hydraulic fluid is lost irretrievably throught the throttle valve, and much of the hydraulic fluid is also lost due to leaks along the rope which passes through the top cover plate of the hollow column. No high pressure can therefore be maintained in the hydraulic system and the capacity of the apparatus is consequently low.

Also known is a hoisting apparatus a platform whereof is linked to a counterbalancing piston which is set into motion inside a cylinder due to the pressure of a hydraulic fluid (cf. U.S. Pat. No. 2,222,685, 187-17). The piston is much heavier than the loaded platform which consequently rises due to the weight of the piston. The platform lowers when the piston rises in the cylinder acted upon by the pressure.

The capacity of this apparatus is decided by the weight of the counterbalancing piston. An increase in the weight entails an increase in the overall dimensions of the cylinder, its bore and mass.

Further known is a hoisting apparatus comprising hydraulic cylinders which are installed vertically in a shaft and are connected to each other and to a pump by hydraulic lines (cf. USSR Inventor's Certificate No. 588,177, IPC B 66 B 9/04). Each of the cylinders has a hollow body, filled with a hydraulic fluid under a pressure, and a piston which is connected to a hoisting cage by a rope passing through a sealing means outside the cylinder. The sealing means is made up of throttle bushings with restrictive clearance and a leak off manifold connected to the inlet into the pump.

The hoisting cages are lifted and lowered by admitting the hydraulic fluid into the piston rod ends and opposite ends of the hydraulic cylinders, respectively, and building up pressure therein.

The known apparatus suffers from inadequate sealing of the hydraulic cylinders. Hydraulic fluid losses occur through the throttle bushings when a pressure differential is being applied thereto and due to the transport of fluid by the rope, some of the lost fluid adhering to the surface of the rope due to friction and some penetrating into the voids between the wires. The leaks increase with the pressure applied to the hydraulic cylinders and the operating speed of the load handling attachments, substantially reducing the capacity and efficiency of the apparatus.

DISCLOSURE OF THE INVENTION

The main object of the invention is to provide a hoisting apparatus with a sealing means at the outlet from the hydraulic cylinder which is leakproof due to certain features of design and the materials used, no matter how high is the rate of hoisting and lowering motions of the load-handling attachment and the pressure applied to the cylinder.

The essence of the invention is that in a hoisting apparatus comprising at least one upright hydraulic cylinder that has a hollow body containing a hydraulic fluid under a pressure and a piston connected to a load-handling attachment via a pliable member which passes at the outlet from the hydraulic cylinder through a sealing means of a space of the body comprising, according to the invention, two consecutively arranged chambers separated by seals, the chamber contiguous to the space of the body being filled with a sealing fluid whose viscosity is higher than that of hydraulic fluid and being connected to a source of the pressure which builds up pressure therein in excess of the pressure of the hydraulic fluid and the other chamber being connected to a separator adapted to separate the hydraulic fluid from the sealing fluid; the outlets from the separator for the hydraulic fluid and sealing fluid being connected to the space of the body of the cylinder and the corresponding chamber of the sealing means, respectively.

It is expedient that the chamber of the sealing means is filled with a fluid that cannot dissolve in the hydraulic fluid and form so stable emulsions and is of a density lower than the density of the hydraulic fluid.

It is preferred to use as the sealing fluid a liquid material possessing lubricity as, for example, gearbox oil.

This plan is conductive to reducing the losses of hydraulic fluid through the sealing means of the pliable member and to using high pressure in the hydraulic cylinder which permits to increase the capacity of the hoisting apparatus.

The sealing fluid contained in the chamber under a pressure higher than the pressure of the hydraulic fluid in the cylinder envelopes the pliable member at the surface thereof, stopping thus hydraulic fluid leaks along the surface. The sealing fluid also enters the voids between the rope wires, if the pliable member is a rope, preventing hydraulic fluid leaks through the cross-section of the rope. Since the sealing fluid is more viscous than the hydraulic fluid, the rate of outflow of the former from the chamber—the source of pressure replenishes the resulting loss—is smaller than the rate of flow of the latter through the sealing means by a factor decided by the ratio of the two viscosities. The more viscous is the sealing fluid, the less its loss without impairing the effectiveness of the seal. However, the viscosity of the sealing fluid should not exceed a limit which keeps the pour point of the fluid within the range of operating temperatures.

The physical and chemical properties of the sealing fluid should prevent it from dissolving in the hydraulic fluid and forming stable emulsions therewith.

A failure to observe this recommendation renders impossible the separation of the sealing fluid from the hydraulic fluid and will lead to irrecoverable losses of the sealing fluid.

It is also expedient that the density of the sealing fluid is less than the density of the hydraulic fluid.

In this case, the light sealing fluid dragged over by the pliable member into the hydraulic cylinder due to friction will accumulate there in the topmost position, that is immediately below the sealing means, wherefrom it can be readily drained into the separator over a line. It is preferred that the sealing fluid possesses good lubricity and is, for example, gearbox oil.

This reduces the friction forces in the sealing means, lubricates components, ensuring reliability and long service life of the hoisting apparatus.

The second chamber of the sealing means, which is located in succession of the first one and is connected to the separator, functions as a collector of the hydraulic and sealing fluids escaped from the cylinder and sealing means, respectively, due to the wettability of, and adhesion to, the pliable member. The leaks of sealing fluid through the seal between the two chambers, which are brought about due to the pressure differential in the chambers, also accumulate in the second chamber. The mixture of fluids collected in the second chamber is fed into the separator.

The second chamber prevents irrecoverable losses of the hydraulic and sealing fluids due to external leaks.

The source of pressure connected to the chamber filled with sealing fluid builds up pressure therein in excess of the pressure in the hydraulic cylinder, preventing thus leaks of hydraulic fluid through the sealing chamber.

The separator communicating with the hydraulic cylinder within the zone of accumulating of the sealing fluid carrier over therein and also connecting to the second chamber of the sealing means serves to separate the two fluids and return them into their original circuits of circulation.

The disclosed sealing means of the pliable member which is set into motion by the hydraulic cylinder of the hoisting apparatus provides for a complete recovery of the sealing fluid and prevents irretrievable losses of the hydraulic fluid due to leaks.

BRIEF DESCRIPTION OF THE DRAWINGS

A preferred embodiment of the invention will now be described by way of an example with reference to the accompanying drawings in which.

BEST MODES FOR CARRYING OUT THE INVENTION

Figure 1:
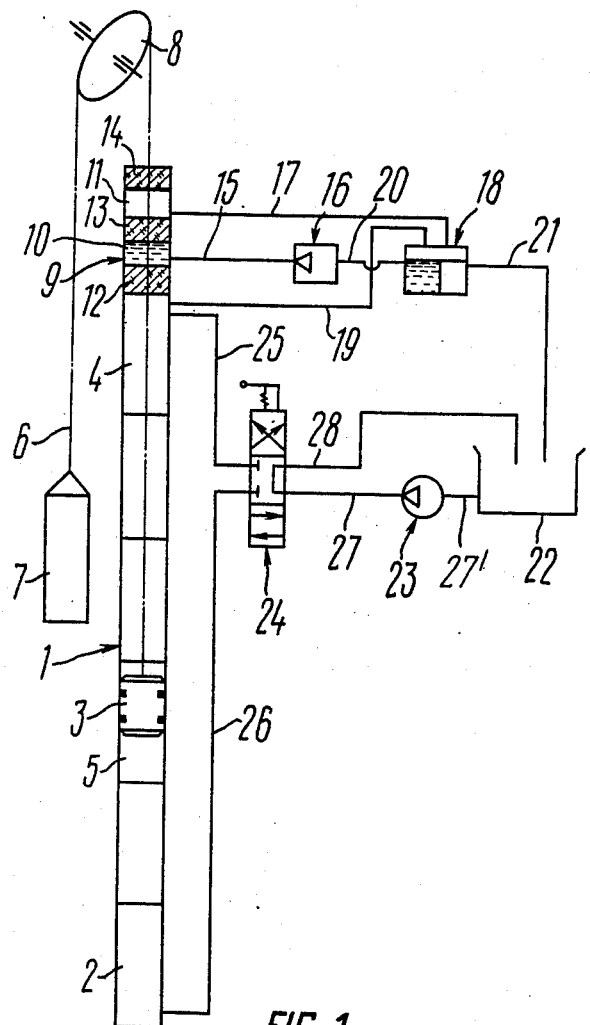
FIG. 1 is a general schematic representation of an apparatus according to the invention.

Referring to FIG. 1, the hoisting apparatus incorporates an upright hydraulic cylinder 1 filled with a hydraulic fluid of any kind—water-oil emulsion, various synthetic liquids, lubricating oils, etc. A water-oil emulsion is a preferred fluid owing to its low viscosity and low cost. The body of the hydraulic cylinder 1 is made up of sleeves 2 which are interconnected by leakproof joints. A piston 3 divides the body of the hydraulic cylinder 1 into two spaces 4 and 5. A pliable member 6 connects the piston 3 to a load-handling attachment 7. Ropes or tapes of any kind can be used as the pliable member 6 but preference is given to steel locked-coil wire ropes with a circular cross-section which can sustain significant loads and is commonly used in materials handling installations. The load-handling attachment 7 can be a cage, a skip, a bucket, a cabin, a platform and any other device used in materials handling.

The pliable member 6 passes over a deflection sheave 8 fitted above the level of unloading the load-handling attachment 7 and through a sealing means 9 located at the outlet from the space 4 of the hydraulic cylinder 1. According to the invention, the sealing means 9 comprises two chambers 10 and 11 arranged in succession and formed by the body of the hydraulic cylinder 1 and seals 12, 13, 14. The chamber 10 contiguous to the space 4 of the hydraulic cylinder 1 is filled with a sealing fluid the viscosity whereof is higher than the viscosity of the hydraulic fluid in the space 4 and is connected via a line 15 to a source 16 of pressure which builds up the pressure in the chamber 10 in excess of the pressure of the hydraulic fluid in the space 4. The chamber 11 communicates through a line 17 with a separator 18 adapted to separate the sealing fluid from the hydraulic fluid. The separator 18 is connected, in its turn, to the space 4 of the hydraulic cylinder 1 over a line 19, to the source 16 of pressure via a line 20 and to a service tank 22 by means of a line 21. The tank 22 provides a supply of hydraulic fluid to a pump unit 23.

The source 16 of pressure can be a pump of any type or a booster in the form of differential hydraulic cylinders. The power for operation can be provided from an external source or the energy of the hydraulic fluid outflowing from the space 4 of the hydraulic cylinder 1 can be transformed to provide the motive power.

The last-named method is given preference, for the pressure applied to the sealing fluid changes in this case automatically depending on the variations in the pressure in the space 4 of the hydraulic cylinder 1. No extra source of energy is required.

The separator can be of the centrifugal or gravitational type which is used to separate liquids with different densities. Preference is given to the gravitational type which relies for operation on hydrostatic forces and consumes a minimum of energy.

The sealing fluid filling the chamber 10 must have a kinematic viscosity which is higher than that of the hydraulic fluid. The hydraulic fluid must be selected so that its chemical and physical properties prevent the solving of the sealing fluid therein and the forming of the stable emulsions when the two fluids are intermixed. Moreover, the sealing fluid must have a density which if lower than the density of the hydraulic fluid, and good lubricity of the sealing fluid is also desirable. It is, for example, a good practice to use gearbox oil possessing all the required qualities as the sealing fluid if the hydraulic fluid is a wateroil emulsion.

The disclosed sealing means 9 of the pliable member 6 provides for minimizing the leaks of hydraulic fluid from the space 4 of the hydraulic cylinder 1. It also permits to increase the working pressure in the space 4 and increase thus the capacity of the hoisting apparatus. The disclosed sealing means 9 also provides for a complete recovery of the sealing fluid and prevents irrecoverable losses of the hydraulic fluid.

The pump unit 23 is connected to the spaces 4 and 5 of the hydraulic cylinder 1 and the tank 22 with hydraulic fluid through a control valve 24 and lines 25, 26, 27, 28, 29.

The pump of the pump unit 23 can be of either the positive-displacement type (axial-plunger, radial-plunger, plunger, screw, gear, guided-vane, etc) or the hydrodynamic types (centrifugal, axial, peripheral). The former are used when high-capacity with a low hoisting speed are chief considerations. The latter find application when high hoisting speed and comparatively low capacity are the requirements. A high-capacity high-speed hoisting apparatus must be equipped with a multi-stage centrifugal pumps capable of developing high pressure.

The lines 25, 26, 27, 28 and 29 can be either metal tubes or flexible hoses with a cross-sectional area which is consistent with the delivery of the pump unit.

The control valve 24 serves to control the motions and a tops of the load-handling attachment. 7. Any multi-position sleeve or spool valve of an adequate clear bore size can be used as the control valve. It can be actuated by hand, hydraulic or pneumatic means, electric motors and the like. Other valves approximately interconnected so as to direct the flow of hydraulic fluid as required are a suitable alternative. The control valve can be provided with means of controlling the flow rate which will control the speed of the load-handling attachment 7.

Figure 2:
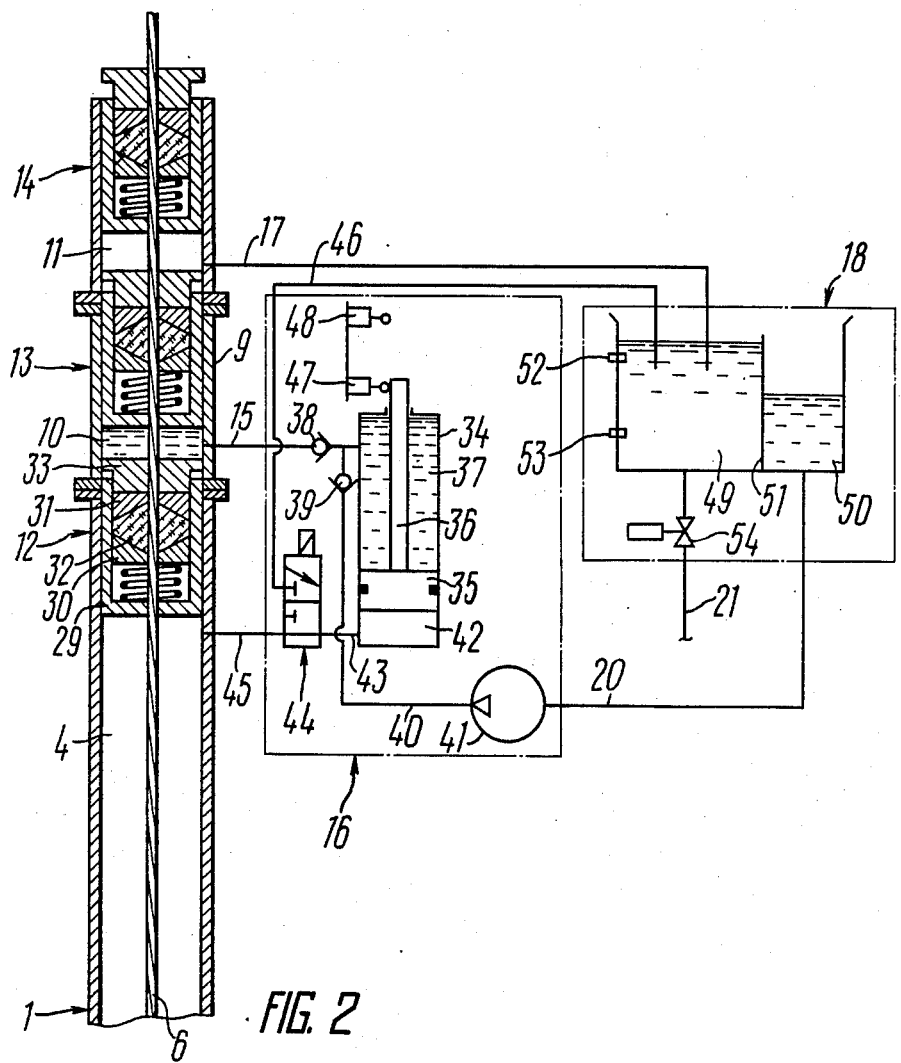
FIG. 2 is a sectional elevation of a sealing means which also illustrates design features of a source of pressure and a separator along with the layout of hydraulic lines.

FIG. 2 illustrates a preferred embodiment of the sealing means 9, the source of pressure 16, the separator 18 and the way these units are interconnected.

The sealing means 9 passing wherethrough is the pliable member 6 comprises two consecutively located chambers 10, 11 which are bound by the body of the hydraulic cylinder 1 and the seals 12, 13, 14. Throttle bushings with restrictive clearances, differential seals with floating rings or floating rods, O-rings of all kind, stuffing boxes with the packing of hemp, cotton, asbestos, wire-inserted yarn, fluoroplastic resilient polymer materials and plastics can be used as the seals. A maximum sealing effect is obtained with a resilient wear-resistant packing as, for example, polyurethane when the pliable member 6 is a locked coil rope.

Each of the seals 12, 13, 14 incorporates a holder 29 which is done up to the cylinder body and contains guide bushings 30, 31 made an antifriction material, resilient seal 32 proper, a gland 33 and a spring which is fitted at the high-pressure end for better sealing effect. For the seals 12, 13, the high-pressure zone is the chamber 10 and for the seal 14, the chamber 11.

The chamber 10 is filled with a sealing fluid which is more viscous than the hydraulic fluid in the space 4 of the hydraulic cylinder 1. The chamber 10 is connected to the source 16 of pressure which builds up therein pressure exceeding the pressure in the space 4. The source 16 of pressure comprises a hydraulic cylinder 34 with a piston 35 and a one-ended piston rod 36. The piston-rod end 37 of the cylinder 34 is filled with the sealing fluid and is connected to the chamber 10 through a check valve 38 and the line 15 end to a pump 41 via a check valve 39 and a line 40. The outflow of sealing fluid from the separator 18 reaches the pump 41 over the line 20. The pump 41 for filling the piston-rod end 37 of the cylinder 34 with sealing fluid can be of any low-pressure type suitable for handling viscous fluids and capable of actuating the piston 35 with the piston rod 36 in no-load position. A piston end 42 of the hydraulic cylinder 34 is connected to an on-off spool valve 44 through a line 43. The spool valve 44, which can be of any type actuated manually, electrically, hydraulically or pneumatically, communicates with the space 4 of the hydraulic cylinder 1 through a line 45 and with the inlet into the separator 18 via a line 46.

The position of the piston rod 36 of the hydraulic cylinder 34 is monitored by transducers 47, 48 which are connected to the means of actuating the spool valve 44 and the pump 41 and generate signals that control the operation of filling the hydraulic cylinder 34 with sealing fluid. The transducers are limit switches of any known type employing the same emergy as the actuator of the spool valve 44 and that of the pump 41.

The pressure in the chamber 10 invariably exceeds that in the space 4 of the hydraulic cylinder 1 because of the surface area exposed to the pressure in the space 37 being smaller than the surface area acted upon by pressure in the space 42 by the cross-sectional area of the piston rod 36.

Such an arrangement of the source 16 of pressure requires no extra energy input as this could be the case if the chamber 10 is fed directly by the pump 41. As a result, the pump 41 builds up the pressure needed just to fill the hydraulic cylinder 34 with sealing fluid which exerts a minimum load on the piston 35 instead of maintaining a constant pressure that exceeds the pressure in the space 4 of the hydraulic cylinder 1. The hydraulic cylinder 34 connected to the space 4 enables the pressure in the chamber 10 to be changed automatically with the pressure in the space 4 and reduces the flow rate of sealing fluid when the load on the hydraulic cylinder 1 is less than a maximum one. This reduces the power requirements of the sealing means 9 of the pliable member 6.

The chamber 11 serves to accumulate the sealing and hydraulic fluids which have escaped from the chamber 10 due to the wettability of, and adhesion to, the pliable member 6 and due to leaks through the seal 13 brough about by the pressure in the chamber 10. The chamber 11 is connected to the inlet into the separator 18 by the line 17. The separator 18 comprises two chambers 49, 50 separated by a weir 51 of a height lower than that of the separator walls. The sealing fluid separated from the mixture accumulates in the chamber 50 wherefrom it reaches the inlet into the pump 41 over the line 20. The chamber 49 is filled with a mixture of hydraulic and sealing fluids from the chamber 11 via the line 17 and from the space 4 of the hydraulic cylinder 1—where the leaks from the sealing means 9 accumulate while the spool valve 44 is in its original position—via the line 46 when the spool valve is set upon. The less heavy sealing fluid rises to the top of the chamber 49 and, overflowing the weir 51, accumulates in the chamber 50. Two level-monitoring transducers 52, 53 of any known type (electrical, ultrasonic, nucleonic, gravimetric) are provided in the chamber 49. They are arranged to change their signal when the interface between the two fluids registers with the either of them.

The transducer 52 is located somewhat below the top of the weir 51 to trigger a signal which opens a valve 54 connecting the chamber 49 via the line 21 to the tank 22 when the interface is level with the transducer 52. The transducer 53 is located in the lower part of the chamber 49 and generates a signal which closes the valve 54 when the interface reaches the transducer 53.

The valve 54 can be of any known type actuated electrically, mechanically, pneumatically, manually or gravimetrically.

The disclosed separator of the gravitational type provides for a complete separation of the fluids with different densities, requires very little power and its of simple construction.

The disclosed sealing means 9 of the pliable member 6 increases the capacity of the noisting apparatus because a total recovery of sealing fluid and an elimination of the leaks of hydraulic fluid enable the pressure in the space 4 of the hydraulic cylinder 1 to be kept at a high level.

A schematic representation of the noisting apparatus according to the invention is given in FIG. 1.

When the control valve 24 is set to neutral, the spaces 4 and 5 are disconnected from the hydraulic system and the piston 3 together with the load-handling attachment connected thereto with the aid of the pliable member 6 are at rest. When the control valve 24 is set to "moist", the pump unit 23 feeds hydraulic fluid into the space 4 of the hydraulic cylinder 1 through the line 27, passages in the control valve 24 and the line 25. A pressure buildup in the space 4 causes the piston 3 to move downwards while the load-handling attachment 7 connected to the pliable member 6 begins to travel upwards. For stopping the load-handling attachment 7, the control valve 24 must be set to neutral, and for reversing the direction of travel of the load-handling attachment, the control value must be set to "lower".

The sealing means 9 of the pliable member 6 operates on the following lines (FIG. 2). The pressure applied to the space 4 of the hydraulic cylinder 1 is transmitted to the space 42 of the hydraulic cylinder 34 through the line 45, the spool valve 44 and the line 43. The pressure set up by the piston 35 in the piston-rod end 37 of of the hydraulic cylinder 34 and augmented due to the difference in the surface areas of the piston 35 in the spaces 37 and 42 is applied to the chamber 10 through the check valve 38 and the line 15. The pressure differential in the chamber 10 compared with the space 4 causes the sealing fluid to envelop the pliable member 6 and, if this is a rope, to enter into the voids between the wires, creating a barrier which prevents leaks of the hydraulic fluid along the surface and through the cross section of the pliable member 6. The leaks of sealing fluid brought about by the pressure differential between the chamber 10 and the space 4 as well as between the chambers 10 and 11 when the pliable member 6 is at rest is decreased by a factor equalling the ratio of the viscosity of sealing fluid and that of hydraulic fluid. The leaks of sealing fluid from the chamber 10 into the space 4 through the seal 12 also prevent the leaks of hydraulic fluid from the space 4. The depth of the layer of sealing fluid in the space 4 is decided by the position of the line 45 connected to the hydraulic cylinder 1.

During the hoisting of the load-handing attachment 7, the pliable member 6 passing through the chamber 10 carries away a film of sealing fluid into the space 4 of the hydraulic cylinder 1 due to the effect of wettability. However, the film will separate from the pliable member 6 in the space 4 on its own accord and the sealing fluid forming the film will rise to the surface where it will form a layer of a density lower than that of the hydraulic fluid which is also neither dissolvable in the hydraulic fluid nor forms stable emulsions therewith. The layer will be located just below the sealing means 9. During the lowering of the load-handling attachment 7, the pliable member 6 carries away some hydraulic fluid from the space 4 and some sealing fluid from the chamber 10 into the low pressure chamber 11, due to wettability, where the seal 14 separates the fluid film from the pliable member 6. The mixture of hydraulic and sealing fluids accumulated in the chamber 11 is fed into the separator 18 by gravity if the separator is located lower than the chamber 11 or due to a slight pressure differential if the separator is located higher than the chamber 11.

The outflow of sealing fluid from the chamber 10 is replenished by the hydraulic cylinder 34. The piston 35 expelling the sealing fluid from the space 37 rises and so does the piston rod 36. As soon as the piston rod 36 reaches the transducer 48, a signal is generated which actuates the spool valve 44 and starts the pump 41. The spool valve 44 shuts up the line 45 and connects the line 43 to the line 46, and the pump 41 feeds sealing fluid from the chamber 50 to the space 37 over the line 40 and the check valve 39. The sealing fluid entering the piston-rod end 37 of the hydraulic cylinder 34 causes the piston 35 and the piston 36 to move downwards. The mixture of sealing and hydraulic fluids present in the space 42 is expelled by the lowering piston 35 into the separator 18 over the line 43, the spool valve 44 and the line 46. The check valve 38 prevents an outflow of sealing fluid from the chamber 10, maintaining the pressure therein unchanged. When the piston rod 36 contacts the transducer 47, a signal is generated which stops the pump 41 and sets the spool valve 44 into the original position. The check valve 39 prevents a backflow of sealing fluid from the space 37 into the chamber 50 through the pump 41.

The mixture of sealing and hydraulic fluids in the chamber 49 is separated due to the effect of hydrostatic forces and the sealing fluid rises to the surface where it forms a distinct interface with the hydraulic fluid. As the inflow into the chamber 49 continues, the sealing fluid starts overflowing the weir 51 and the interface gradually rises. When the upper level of hydraulic fluid reaches the transducer 52, a signal is generated which opens the valve 54 so that the chamber 49 is connected to the tank 22 via the line 21. The level of hydraulic fluid in the chamber 49 decreases and as soon as it reaches the transducer 53 the valve 54 is closed. After that the cycle is repeated and each time the sealing and hydraulic fluids are returned into their respective circuits of circulation.

The losses of the hydraulic fluid from the space 4 of the hydraulic cylinder 1 are incurred by the pliable member 6, which carries away the fluid adhereing thereto due to friction, and by the source 16 of pressure when this is in operation. The amount of hydraulic fluid carried away by the pliable member 6 varies directly with the speed of this member and with the working clearance in the seals 12, 13. The use of seals which are automatically pressed against the pliable member by springs and the pressure of sealing fluid applied to the gland 33 minimizes the losses of fluid along the pliable member. The flow rate of hydraulic fluid that is needed to keep the source 16 of pressure functioning is decided by the flow rate of sealing fluid through the chamber 10 and varies inversely therewith by a factor equalling the ratio of the surface area of the piston 35 facing the space 37 and that facing the space 42. The flow rate of sealing fluid in the chamber 10 is determined by the losses of the fluid with the pliable member 6 when this passes through the seals 12, 13 and the leaks through the seal brought about by the differential pressure at the seals which varies inversely with the kinematic viscosity of sealing fluid. The higher the viscosity, the smaller the losses of sealing fluid and the less the need in hydraulic fluid that is required to ensure the sealing effect. The source 16 of pressure which incorporates the hydraulic cylinder 34 wherein the ratio of surface areas of the piston 35 facing the spaces 37 and 42 is between 1 and 2 and which uses gearbox oil with a kinematic viscosity of 3600 cSt as the sealing fluid and an water-oil emulsion with kinematic viscosity of 1.4 cSt as the hydraulic fluid can reduce the leaks of hydraulic fluid by a factor between 2300 and 1200 respectively compared with other known hoisting apparatus of similar kind described hereinabove.

The disclosed sealing means of the pliable member in the hoisting apparatus according to the invention provides for a significant increase in the allowable pressure in the hydraulic system. This, in its turn, provides for increasing the capacity of the hoisting apparatus without increasing the bore of the hydraulic cylinder or adding more metal to the hydraulic system.

FIG. 1 illustrates an embodiment of the invention with just one hydraulic cylinder and one load-handling attachment. The hoisting apparatus according to the invention can comprise two and more hydraulic cylinders which are hydraulically interconnected and operate pistons linked to load-handling attachments by pliable means. Such a plan shortens the operating cycle of hoisting or lowering a load and increases consequently the capacity of the installation. It also increases the efficiency of the hoisting apparatus and provides for fitting the apparatus with a pump unit of reduced power output which is partly compensated by the potential energy of the load-handling attachments alternately hoisted to their topmost positions. In an apparatus with single load-handling attachment this energy is lost irrecoverably.

Figure 3:
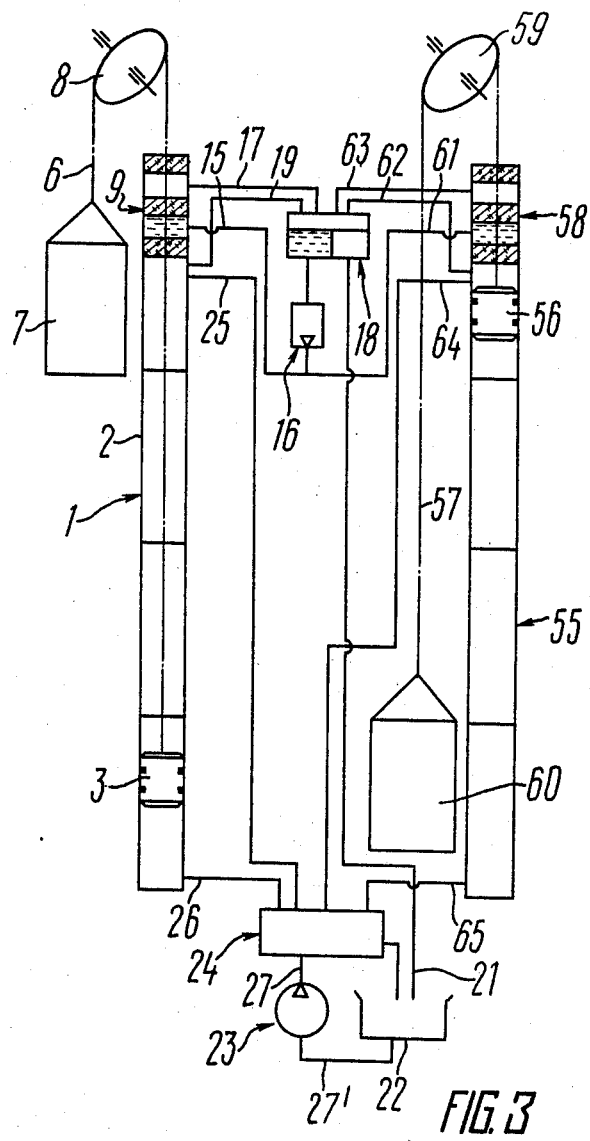
FIG. 3 is a schematic representation of the apparatus with two load-handling attachments.

FIG. 3 illustrates a schematic diagram of the hoisting apparatus with two load-handling attachments. The sealing means of the pliable members remain the same. Also just one separator and one only source of pressure are used so that the hydraulic system remains unchanged. The only difference compared with the apparatus depicted in FIG. 1 is an extra hydraulic cylinder 55 the piston whereof is connected to a load-handling attachment 60 by way of a pliable member 57 which isp provided with a sealing means 58 and passes over a sheave 59. The hydraulic cylinder 55—an analogue of the hydraulic cylinder 1 in point of design—is connected to the source 16 of pressure through a line 61, to the separator 18 via lines 62, 63 and to the control valve 24 by lines 64, 65. The control valve 24 is arranged so as to connect the hydraulic cylinders 1, 55 to each other and the pump unit 23 independently, in series or in parallel.

When the hydraulic cylinders 1, 55 are connected in series, the lines 25, 64 are interconnected and the lines 26, 65 are alternately connected to the pump unit 23 and the drain tank 22. The load-handling attachment 7 consequently lowers while the load-handling attachment 60 lifts. This mode of operation is referred to as two-end hoisting. The opposing pressures set up by the pistons 3, 56 due to the dead weight of the load-handling attachments 7, 60 are at balance in this case so that the pump unit 23 oversomes the load due to the weight of the load hoisted and the friction resistance in the lines. A couterweight can be attached to the pliable member 57 instead of the load-handling attachment 60.

The two-end hoisting operation of the apparatus increases its efficiency and requires a low-power pump unit.

When the hydraulic cylinders 1, 55 are connected in parallel, hydraulic fluid is simultaneously fed through the lines 25, 64 and drained through the lines 26, 65. After that the direction of its flow is reversed in these lines. The load-handling attachments 7, 60 will consequently lift or lower, both at a time. A bulky load occupying both attachments or a double load which can be accommodated in a single attachment are handled thus at half rated speed.

An independent connection of the hydraulic cylinders renders one of them redundant and immovable. In operation stays just one load-handling attachment as illustrated in FIG. 1. The load-handling attachments can be interchanged so as to serve different levels in a mine or the idle attachment can be used as a standby hoisting means. The efficiency of the apparatus is reduced, however, in this case due to an irrecoverable loss of the potential energy of the load-handling attachment that is being lowered.

The source 16 of pressure and the separator 18 operate in the same way as described hereinabove. It will be only noted that the source 16 of pressure feeds sealing fluid into both sealing means 9, 58 under the same pressure and the separator 18 receives a mixture of sealing and hydraulic fluids from the two hydraulic cylinders 1, 55. No extra means of exerting pressure on sealing fluid and no extra separator is required of the hoisting apparatus is equipped with the second hydraulic cylinder 55.

The hoisting apparatus according to the invention provides for increasing the sunk shaft capacity.

INDUSTRIAL APPLICABILITY

The present invention is conductive to increasing the working pressure in the hydraulic cylinder of the hoisting apparatus and the capacity thereof. It may find application in hauling men and loads in vertical shaft and over inclines in ore mines and collieries. Construction sites are another field of application.

We claim:

1. A hoisting apparatus comprising at least one upright hydraulic cylinder having a hollow body filled with a pressurized hydraulic fluid;
    a piston received in said hollow body of the hydraulic cylinder for reciprocation under the pressure of the hydraulic fluid;
    a load-handling attachment;
    pliable means connecting said load-handling attachment and said piston for reciprocating said load-handling attachment;
    sealing means for sealing off said hollow body, said sealing means being arranged at the side of said body where said piston is attached to the pliable means which, in turn, passes through said sealing means;

said sealing means including two consecutive chambers;

a first chamber of said sealing means is arranged contiguous to said hollow body and is filled with a viscous fluid having a higher viscosity than the hydraulic fluid;

a second chamber of said sealing means is arranged contiguous to said first chamber and separated therefrom by seals;

pressure means connected to said first chamber to build up a pressure therein that exceeds the pressure of the hydraulic fluid in said hollow body; and separator means communicating with said second chamber, adapted to separate hydraulic fluid from viscous fluid and having a hydraulic outlet connected to said hollow body and a viscous fluid outlet connected to said first chamber of the sealing means for continuously replenishing the latter with viscous fluid discharged from the chamber as the pliable means moves.

2. A hoisting apparatus according to claim 1 wherein the sealing fluid filling said first chamber is of a density lower than the density of the hydraulic fluid in said hollow body.

3. A hoisting apparatus according to claim 1 wherein said sealing fluid is insoluble with said hydraulic fluid and is incapable of forming stable emulsions therewith.

4. A hoisting apparatus according to claim 1 wherein said sealing fluid has the property of lubricity.

5. A hoisting apparatus according to claim 4 wherein the sealing fluid is gearbox oil.

* * * * *